No. 719,962. PATENTED FEB. 3, 1903.
J. O. THOMPSON.
FEED MECHANISM FOR CORN SNAPPING, HUSKING, AND FODDER SHREDDING MACHINES.
APPLICATION FILED JUNE 25, 1901.
NO MODEL. 2 SHEETS—SHEET 1.
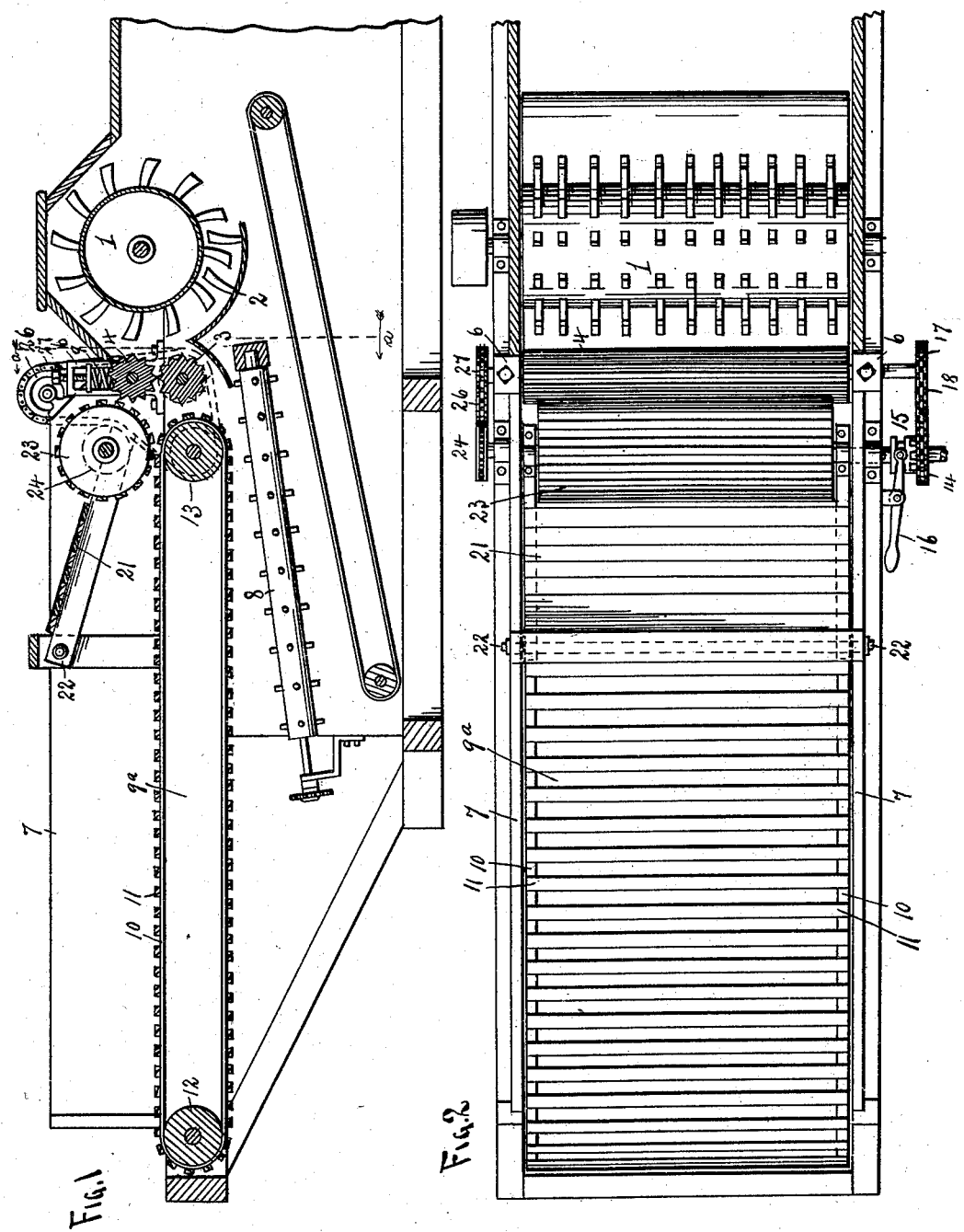
Witnesses
C. N. Woodward
J. W. Garner
J. O. Thompson, Inventor
by C. A. Snow & Co.
Attorneys

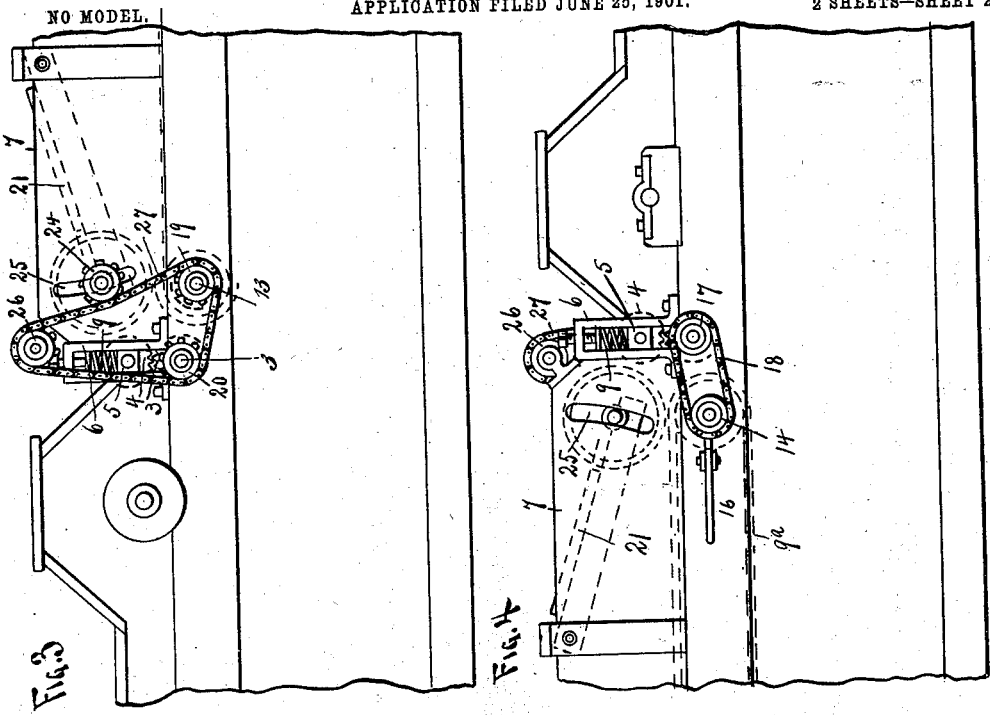
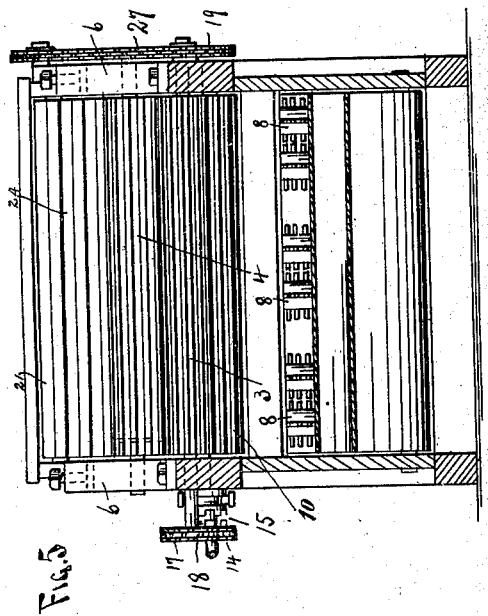

UNITED STATES PATENT OFFICE.

JOHN O. THOMPSON, OF MULBERRY, INDIANA, ASSIGNOR OF ONE-HALF TO GEORGE H. MILLER, OF MULBERRY, INDIANA.

FEED MECHANISM FOR CORN SNAPPING, HUSKING, AND FODDER-SHREDDING MACHINES.

SPECIFICATION forming part of Letters Patent No. 719,962, dated February 3, 1903.

Application filed June 25, 1901. Serial No. 65,974. (No model.)

*To all whom it may concern:*

Be it known that I, JOHN O. THOMPSON, a citizen of the United States, residing at Mulberry, in the county of Clinton and State of Indiana, have invented a new and useful Feed Mechanism for Corn Snapping, Husking, and Fodder-Shredding Machines, of which the following is a specification.

My invention is an improved feed mechanism for corn snapping, husking, and fodder-shredding machines; and it consists in the peculiar construction and combination of devices hereinafter fully set forth and claimed.

One object of my invention is to provide an improved feed-gate at the inner end of the feed-carrier and in proximity to the snapping-rolls to prevent the possibility of the hands of an attendant being caught between the snapping-rolls.

A further object of my invention is to combine with the feed-gate a feed-roller, which is carried thereby, and to provide improved means for conveying power to the said feed-roller irrespective of the position thereof as to its being elevated or depressed.

In the accompanying drawings, Figure 1 is a vertical sectional view of a portion of a corn snapping, husking, and fodder-shredding machine provided with a feed mechanism embodying my improvements. Fig. 2 is partly a top plan view of the same and partly a horizontal section. Fig. 3 is a detail elevation of one side of the machine. Fig. 4 is a similar view of the opposite side thereof. Fig. 5 is a vertical transverse sectional view taken on a plane indicated by the line *a a* of Fig. 1.

The fodder-shredding cylinder 1 is of the usual construction, and the same is true of the coacting fodder-shredding concave 2. In advance of the same is a lower snapping-roll 3, in fixed bearings, and an upper snapping-roll 4, the bearings 5 of which are movable in vertical guideways 6 on opposite sides of the machine casing or frame and at the inner end of the feed-trough 7. Below the snapping-rolls are the usual husking-rolls 8. Springs 9 bear downwardly on the bearings 5 and normally depress the upper snapping-roll, while permitting the same to rise to facilitate the passage of the cornstalks between the snapping-rolls to the shredding mechanism. The snapping-rolls, as will be understood, serve to snap the ears of corn from the stalks, the said ears falling onto the husking-rolls 8, which strip the husks therefrom.

In the bottom of the feed-trough 7 is an endless feed-carrier 9. The same comprises two or more endless belts 10, which are connected together by a series of transversely-disposed slats or bars 11. The said feed-carrier is supported by rollers 12 13. The latter is located near the inner end of the feed-trough and at a slight distance from the lower snapping-roll and is provided at one end with a sprocket-wheel 14, which is loose thereon. I also provide a clutch 15, operated by a lever 16, to lock said sprocket-wheel to the shaft of said roller or unclutch the same therefrom. The lower snapping-roll has a sprocket-wheel 17 on one end of its shaft. An endless sprocket-chain 18 connects the said sprocket-wheels 14 and 17 together. The said shaft of the lower snapping-roll 3 is the power-shaft, and power is conveyed therefrom at will to the roller 13 by the means hereinbefore described, as will be understood. The upper snapping-roll is rotated by frictional contact with the material between the same and the lower snapping-roll. On the end of the roller-shaft 13 opposite the sprocket-wheel 14 is a sprocket-wheel 19. A sprocket-wheel 20 is on the corresponding end of the lower snapping-roll.

In the inner end of the feed-trough 7 is a feed-gate 21, the outer side of which is pivotally supported, as at 22. At the inner side of the said feed-gate is a feed-roller 23, which has its bearings in the said feed-gate and rises and falls therewith, and one end of the shaft of said roller is provided with a sprocket-wheel 24. The end portions of the shaft of the feed-roller 23 pass through and operate in the curved slots 25 in the sides of the feed-trough 7. It will be observed by reference to the drawings that the feed-roller is disposed above the inner end of the feed-carrier. A direction sprocket-wheel 26 is suitably mounted at a point above the sprocket-wheel 20. An endless sprocket-chain 27, which is somewhat slack, connects the sprocket-wheels 19, 20, and 26 together, and one lead of the said sprocket-chain is engaged by the sprocket-wheel 24, with which the feed-roller is provided. It will be understood that thereby power is conveyed to the feed-roller and the same is kept in rotation at all times when the machine is in operation and permitted to rise and fall with the free inner end of the feed-gate. The said feed-roller, as will be understood, coacts with the feed-carrier in feeding the corn to the snapping-rolls, and the feed-gate, which carries the said feed-roller, forms a guard that effectually prevents the attendant from getting his hands caught between the snapping-rolls when feeding corn thereto. Furthermore, the feed-gate coacts with the feed-roller and the feed-carrier in regulating the quantity fed to the snapping-rolls and preventing the latter and the shredding mechanism from becoming choked. The said feed-roller 23 is corrugated, and the cross bars or slats 11 of the feed-carrier also form corrugations on the latter. Thereby maximum frictional contact is maintained between the feed-carrier, the corn, and the feed-roller, and hence the efficiency of the feeding mechanism is increased.

Having thus described my invention, I claim—

1. In a feeder of the class described, the combination of a feed-trough, an endless traveling feed-carrier in the bottom thereof, a gate pivoted above and inclining rearwardly down toward the discharge portion of the feed-carrier, said gate forming a bar to arrest movement of the upper portion of a mass of material in the trough on the feed-carrier, and a positively-driven feed-roller carried by the rear portion of the gate, having its lower side, which coacts with the feed-carrier below the said gate, and adapted to rise and descend therewith, substantially as described.

2. In a feeder of the class described, the combination of a feed-trough, an endless traveling feed-carrier in the bottom thereof, said feed-carrier including a roller having a sprocket-wheel 19; a gate pivoted above and inclining rearwardly down toward the discharge portion of the feed-carrier, said gate forming a bar to arrest movement of the upper portion of a mass of material in the trough on the feed-carrier, a positively-driven feed-roller carried by the rear portion of the gate, having its lower side, which coacts with the feed-carrier below the said gate and adapted to rise and descend therewith, said feed-roller being further provided with a sprocket-wheel 24, a pair of snapping-rolls, one having a sprocket-wheel 3, an idler sprocket-wheel 26 at an elevated point and an endless sprocket-chain connecting said idler sprocket-wheel and the sprocket-wheels 19, 20, one lead of said sprocket-chain being engaged by the sprocket-wheel 24 carried by the feed-roller, whereby the latter is positively driven, substantially as described.

In testimony that I claim the foregoing as my own I have hereto affixed my signature in the presence of two witnesses.

JOHN O. THOMPSON.

Witnesses:
HENRY W. OSTERDAY,
FRANK MILLER.